Patented Oct. 9, 1928.

1,687,154

UNITED STATES PATENT OFFICE.

MYRLE S. BOLTON, OF ROSEMEADE, CALIFORNIA.

FOOD PRODUCT AND PROCESS OF MAKING THE SAME.

No Drawing. Application filed August 31, 1926. Serial No. 132,898.

This invention relates to an improved food product and to the process of making the same. It is particularly an improvement over the product disclosed in the United States Patent No. 604,493, issued to John H. Kellogg, May 24, 1898. The improvement consists in the addition of another substance to the product as disclosed in the above mentioned patent, which addition produces a considerable change in flavor and renders the food much more digestible.

The details of the process are as follows: I take a given quantity of a nut butter, preferably peanut butter, and mix the same with approximately an equal amount of water. This mixture is mixed thoroughly until it has nearly the same consistency as cake batter and is quite thick and creamy. A small amount of salt is then added to the mixture to take care of the addition in volume, it being understood that practically all peanut butter has some salt in it, and when water is added to the peanut butter, a small additional amount of salt should be added. I then add to this mixture sliced sweet cucumber pickles in the ratio of about six to nine small sweet cucumber pickles of the size of one to two inches, to each pound of peanut butter. The complete mass is then placed in containers, such as cans, and sealed therein, and these cans are then placed in a sterilizer or can cooker. In this way the mass is cooked for about twenty minutes under the pressure of about 20 lbs. per square inch. It will be found that after having been cooked the mass will have changed in form, becoming a solid or semi-solid which is capable of being nicely sliced and of about the consistency of cheese or heavy jelly. The new product is quite different from peanut butter which, as well known, has an oily taste and clings to the palate. The new food product resembles cheese or a heavy jelly; the oily taste and the palate clinging property have entirely disappeared. It is believed that the jellifying action is due to the acid contained in the cucumber pickles which activates the pectin material contained in the peanut butter.

This product can be used for many different purposes, most useful purpose being in making sandwiches, preferably putting a slice of the product between lettuce leaves.

The addition of the pickles is quite important. The new product as above provided does not have merely a mixture of peanut butter flavor and pickle flavor, but the flavors blend together producing a new flavor which is quite distinct and independent from either of its constituents. The peanut butter and pickle flavors are hardly discernible by themselves in the product. It will further be found that the addition of the cucumber pickles renders the peanut butter much more digestible and also the pickles which have been sliced will be found to be quite digestible. I have experimented with many other substances instead of sweet cucumber pickles, employing sour cucumber pickles, dill cucumber pickles, olives, sweet pickles made of green tomatoes and cauliflower and many other substances of a like nature, but have determined that sweet cucumber pickles of small size are the only substance which will produce the desired flavor and the desired result.

Various changes may be made in the exact amounts of ingredients and in the steps of the operation without departing from the spirit or scope of the invention as defined by the appended claims.

I claim:

1. A process of producing a food product which consists in mixing a nut butter with water, adding thereto cut up cucumber pickles, sealing the mixture in containers, and cooking the same until the mass becomes a solid or a semi-solid.

2. A process of producing a food product which consists of mixing approximately equal amounts of peanut butter and water, adding to the mixture sliced sweet cucumber pickles, and cooking the mass under pressure until it becomes a solid or a semi-solid.

3. A process of producing a food product which consists of mixing approximately equal amounts of peanut butter and water, adding a small amount of salt, adding sliced sweet cucumber pickles in the ratio of about six to nine small pickles to each pound of peanut butter, and cooking the mass under about 20 lbs. pressure for twenty minutes or until the mass becomes a solid or a semi-solid.

4. A new food product of the consistency of soft cheese, made by cooking under pressure peanut butter and small sweet cucumber pickles whereby the peanut butter is jellified and free of the oily taste of ordinary peanut butter.

In testimony whereof I have signed my name to this specification.

MYRLE S. BOLTON.